US007902960B2

(12) United States Patent
 Tsuchimochi et al.

(10) Patent No.: US 7,902,960 B2
(45) Date of Patent: Mar. 8, 2011

(54) DOOR LOCK MECHANISM CONTROLLER AND METHOD OF CONTROLLING DOOR LOCK MECHANISM

(75) Inventors: Naoki Tsuchimochi, Atsugi (JP);
 Takashi Kimura, Fujisawa (JP);
 Yasuharu Watanabe, Isehara (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 938 days.

(21) Appl. No.: 11/811,748

(22) Filed: Jun. 12, 2007

(65) Prior Publication Data

US 2007/0290792 A1 Dec. 20, 2007

(30) Foreign Application Priority Data

Jun. 12, 2006 (JP) ................... 2006-162176

(51) Int. Cl.
 *B60R 25/00* (2006.01)
 *H04Q 5/22* (2006.01)
(52) U.S. Cl. ................... 340/5.71; 455/556.1; 455/556.2; 340/10.2
(58) Field of Classification Search .................. 455/272, 455/556.1, 556.2, 553.1; 340/10.2, 5.71
 See application file for complete search history.

(56) References Cited

U.S. PATENT DOCUMENTS

| 6,831,547 | B2 * | 12/2004 | Watarai et al. | 340/5.61 |
| 6,937,137 | B1 | 8/2005 | Giehler et al. | |
| 7,187,287 | B2 * | 3/2007 | Ryal | 340/572.1 |
| 7,365,633 | B2 * | 4/2008 | Inoue et al. | 340/5.61 |
| 7,636,560 | B2 * | 12/2009 | Ku | 455/272 |
| 7,686,229 | B2 * | 3/2010 | Lyon et al. | 235/492 |
| 2003/0193388 | A1 * | 10/2003 | Ghabra et al. | 340/5.61 |
| 2004/0263319 | A1 * | 12/2004 | Huomo | 340/10.2 |
| 2007/0165997 | A1 * | 7/2007 | Suzuki et al. | 386/46 |

FOREIGN PATENT DOCUMENTS

| DE | 19922980 | 12/2000 |
| EP | 0523602 | 1/1993 |
| JP | 2005-120662 | 5/2005 |
| JP | 2006-060683 | 3/2006 |

OTHER PUBLICATIONS

European Search Report, Oct. 17, 2007 (6 pages).

* cited by examiner

*Primary Examiner* — Benjamin C Lee
*Assistant Examiner* — Peter C Mehravari
(74) *Attorney, Agent, or Firm* — Osha Liang LLP

(57) ABSTRACT

A door lock mechanism controller includes a first communication device and a second communication device. The first communication device transmits a first radio signal to a first communication terminal through a first antenna so as to receive authentication information for operating a door lock mechanism. The second communication device transmits/receives a radio signal to/from a second communication terminal so as to receive authentication information for operating the door lock mechanism. A control prevents operation of an actuator based on the authentication information received by the second antenna, when the first radio signal is transmitted by the first antenna.

12 Claims, 4 Drawing Sheets

[FIG. 1]
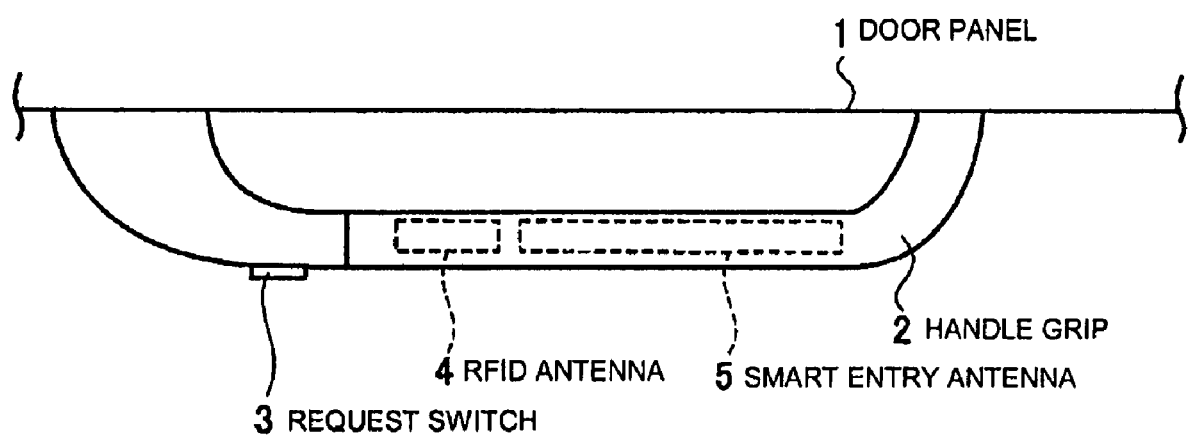

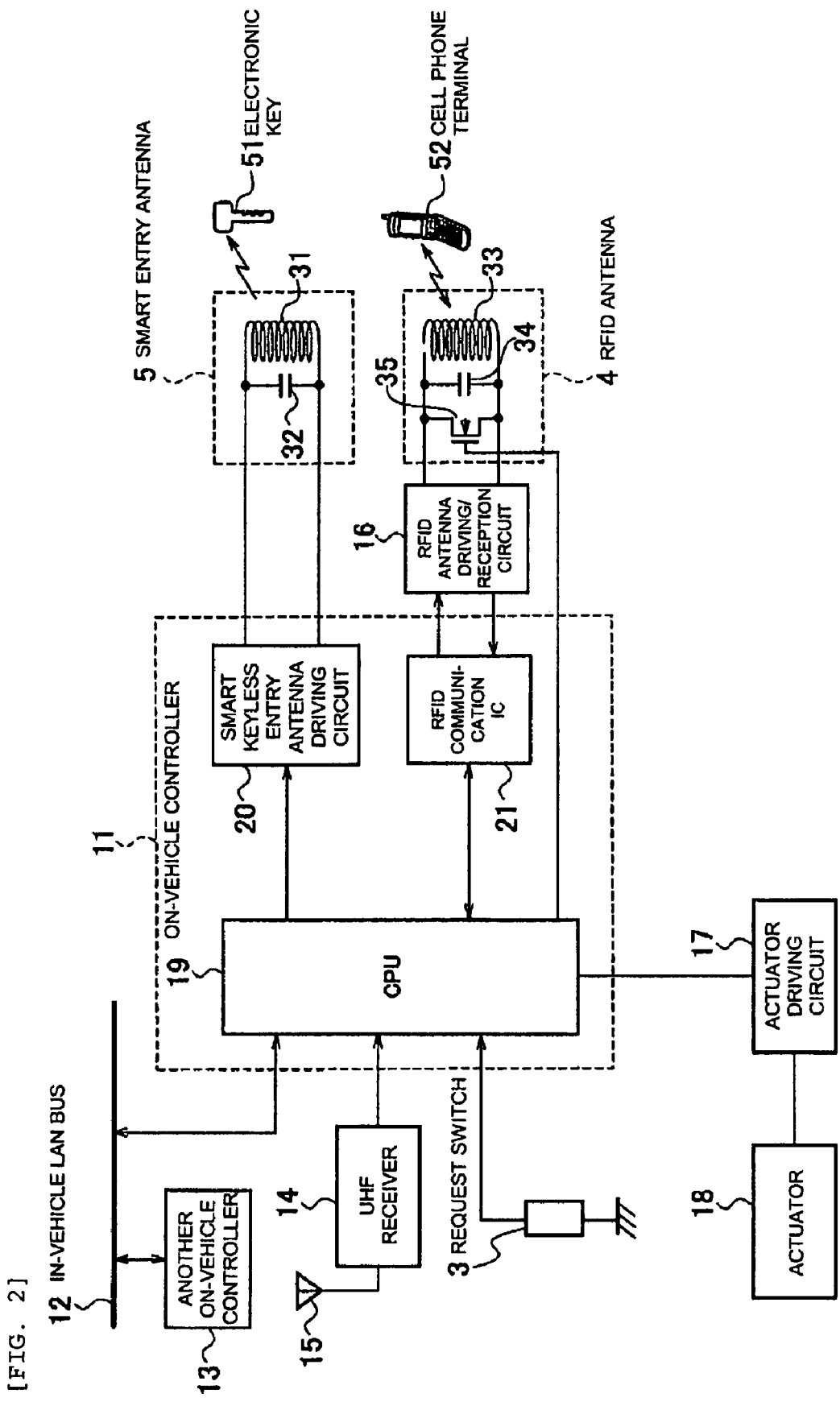

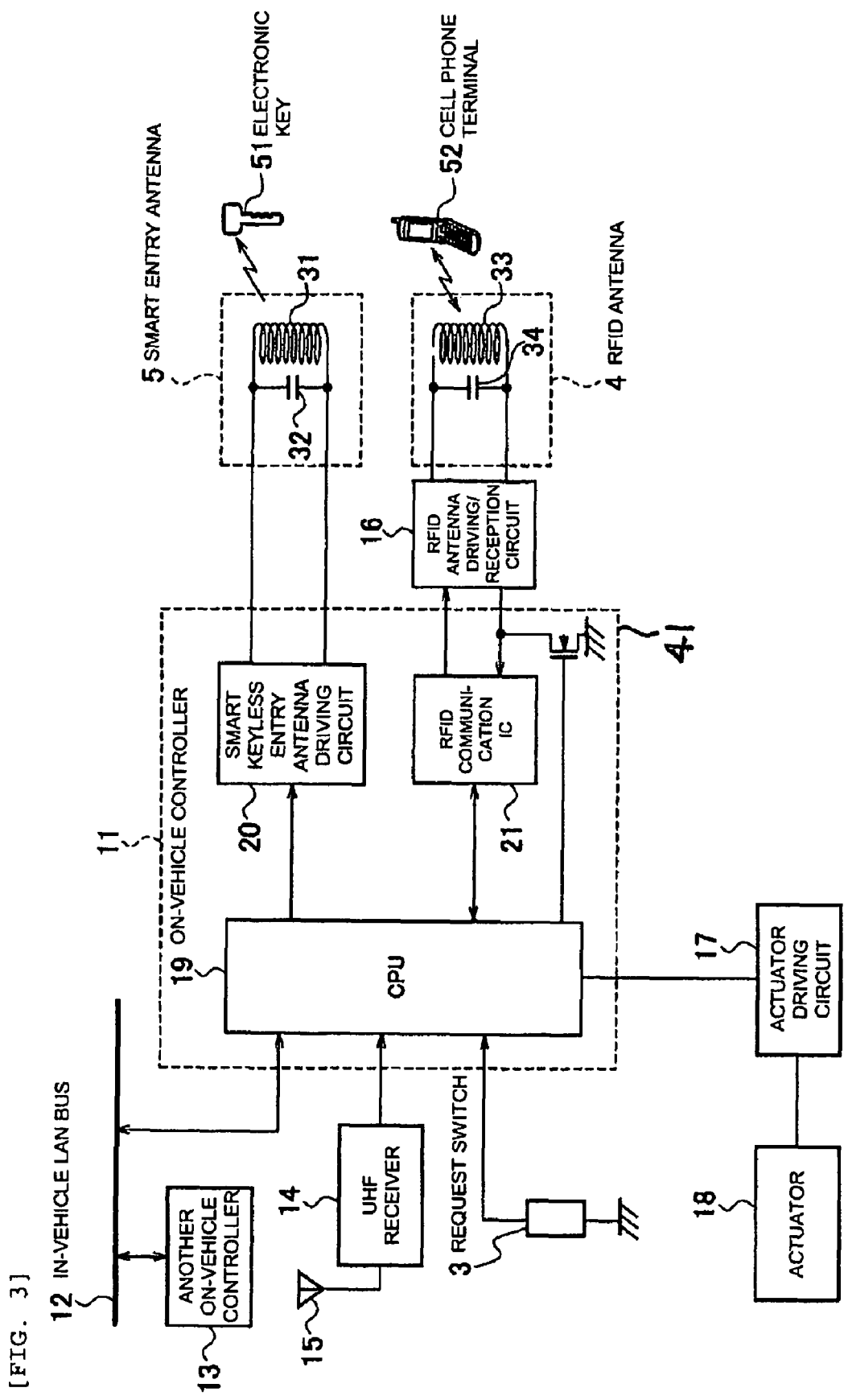

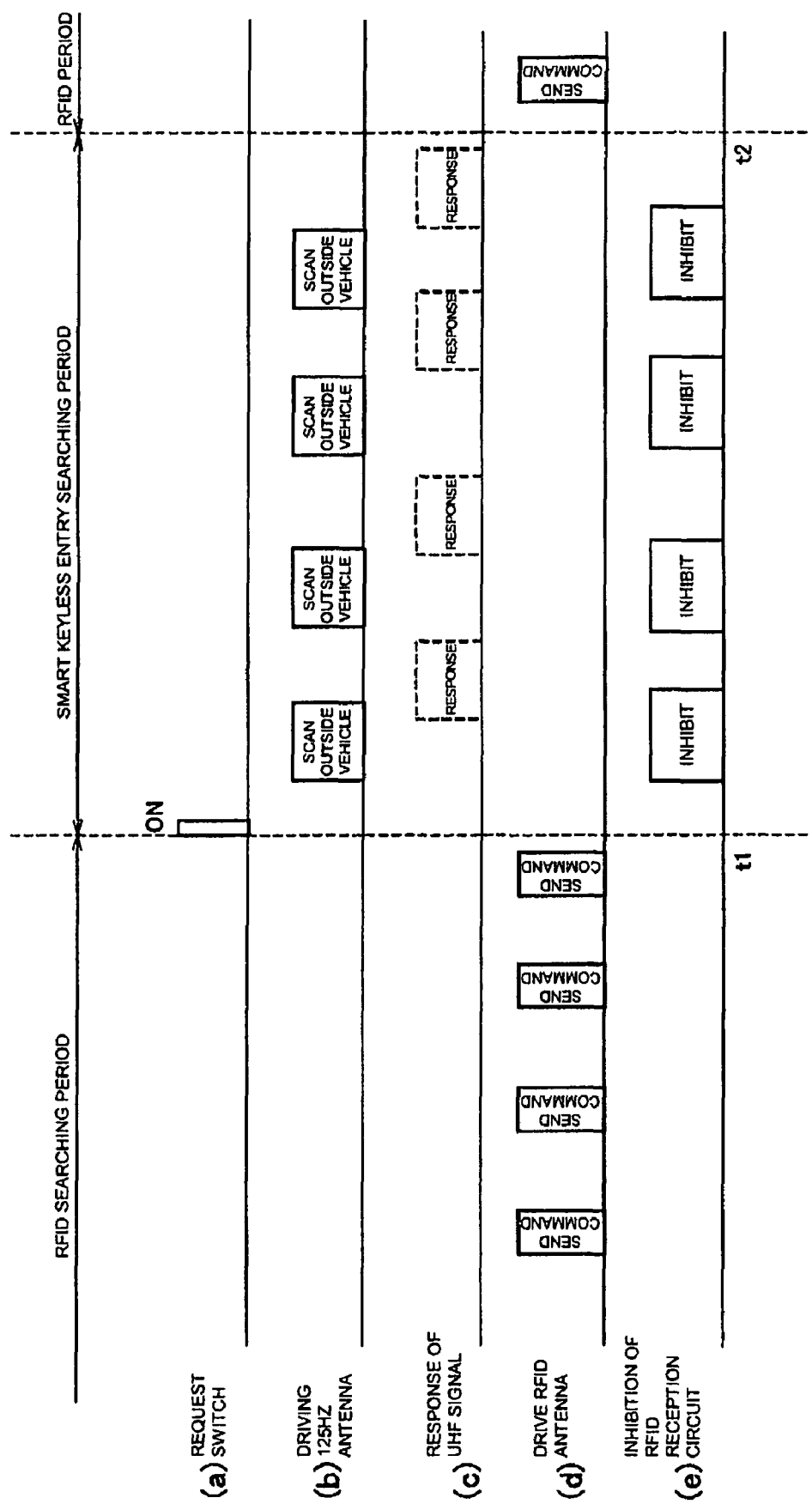

DOOR LOCK MECHANISM CONTROLLER AND METHOD OF CONTROLLING DOOR LOCK MECHANISM

CLAIM TO PRIORITY

The present application claims priority under Japanese patent application No. JP2006-162176 filed Jun. 12, 2006 owned at the time of application and incorporated by reference in its entirety.

TECHNICAL FIELD

The present invention relates to a door lock mechanism controller and a method of controlling a door lock mechanism for vehicles and the like using a radio communication technique.

BACKGROUND

Japanese Patent Application Laid-Open (JP-A) Nos. 2006-060683 and 2005-120662 disclose conventionally-known keyless entry systems for locking/unlocking a vehicle's door by driving a door lock mechanism of a vehicle, using a radio communication technique.

According to the technique of JP-A-2006-060683, communications are performed between a radio IC tag incorporated into a cell phone and a reader/writer installed into a vehicle, thereby operating the vehicle's door lock mechanism so as to lock and unlock the vehicle's door.

According to the technique of JP-A-2005-120662, a user presses a request switch provided on a vehicle's door handle, thereby activating a communication circuit including an antenna which is provided in the vehicle's door handle and also generating a magnetic field within a predetermined range from this antenna. When an electronic key exists within the range of the magnetic field, an ID signal is sent from the electronic key to the communication circuit. ID information from the electronic key received by the communication circuit is compared with a proper ID that is kept in the vehicle. When it is determined that the ID from the electronic key is proper, the door lock mechanism of the vehicle is operated so as to lock or unlock the vehicle's door.

SUMMARY OF THE INVENTION

In accordance with embodiments of the invention, a door lock mechanism controller is provided comprising a first communication terminal configured to send a first authentication signal for operating a door lock mechanism, a second communication terminal configured to send a second authentication signal for operating the door lock mechanism, a first antenna configured to send a first radio signal, a second antenna configured to send a second radio signal, a first communication device connected to the first antenna for receiving the first authentication signal from the first communication terminal, and a second communication device connected to the second antenna for receiving the second authentication signal from the second communication terminal, wherein the door lock mechanism is based on a control configured to selectively actuate one of authentication information received by the first communication device and authentication information received by the second communication device, and wherein the control prevents activation of the door lock mechanism based on authentication information received by the second communication device while the first radio signal is being sent by the first antenna.

BRIEF DESCRIPTION OF THE DRAWINGS

FIG. 1 is a schematic diagram showing a structure wherein a smart entry antenna and an RFID antenna are contained in the same handle grip in accordance with an embodiment of the present invention;

FIG. 2 is a block diagram showing the structure of a door lock mechanism controller according to an embodiment of the present invention;

FIG. 3 is a block diagram showing another structure of the door lock mechanism controller in accordance with an embodiment of the present invention; and FIGS. 4A to 4E are timing charts for explaining operation of the door lock mechanism controller according to an embodiment of the present invention, wherein FIG. 4A shows an ON/Off state of a request switch, FIG. 4B shows driving states of a smart keyless entry antenna, FIG. 4C shows reception states of a UHF antenna, FIG. 4D shows driving states of an RFID antenna, and FIG. 4E shows operational states of an RFID antenna driving/reception circuit.

DETAILED DESCRIPTION

Alternative embodiments of the present invention will now be described with reference to the drawings. Like items in the drawing figures are shown with the same reference numbers.

To improve user convenience, it may be desirable to implement both a door lock mechanism controlling function using a radio IC tag (such as that described in JP-A-2006-060683) and a door lock mechanism controlling function using an electronic key (such as that described in JP-A-2005-120662) at the same time. However, the following problem may occur if both of these controlling functions are installed into a single vehicle so as to use both communication systems.

For example, when the user presses the request switch described in JP-A-2005-120662, a magnetic field is generated from an antenna communicating with the electronic key. In this case, the magnetic field causes a leakage flux that is detected by the reader/writer communicating with the radio IC tag. This may result in malfunction of the reader/writer.

One or more embodiments of the present invention has been made in consideration of the above. Therefore, in accordance with embodiments of the present invention, a door lock mechanism controller is provided that is capable of avoiding interference between antennas of different communication systems, performing stable communication using the different communication systems, and controlling a door lock mechanism. A method of controlling the same is also provided.

According to an embodiment of the present invention, as shown in FIG. 1, a request switch 3, an RFID (radio frequency identification) antenna 4 and a smart entry antenna 5 are mounted within a handle grip 2 of a door handle attached to a door panel 1 of a vehicle. The RFID antenna 4 and the smart entry antenna 5 both generate a radio signal due to magnetic field variation. Thus, the antennas 4 and 5 are incorporated into the resinous handle grip 2 in order to avoid narrowing the communication range due to effects of the metal door panel 1.

FIG. 2 is a block diagram showing a door lock mechanism controller in accordance with an embodiment of the present invention. The smart entry antenna 5 sends a radio signal in the form of a carrier wave (e.g., of 125 kHz) to a predetermined range when the request switch 3 has been pressed. This smart entry antenna 5 includes a resonant circuit having a coil 31 and a capacitor 32 so as to send the above-described radio signal. An antenna (not illustrated) having the same structure as that of the smart entry antenna 5 is provided inside the vehicle, which sends a radio signal to search for an electronic key 51 inside the vehicle.

When the electronic key 51 exists within the predetermined range of the radio signal from the smart entry antenna 5, that is, when the electronic key 5 receives the radio signal sent from the smart entry antenna 5, it sends ID information stored in a memory (not illustrated) of the electronic key 51. This ID information of the electronic key 51 is authentication information used by an on-vehicle controller 11 for authenticating the key 51.

The ID Information sent by the electronic key 51 is received by a UHF antenna 15, is input to a UHF receiver 14, and is then output to a CPU 19. The UHF receiver 14 filters out its UHF carrier wave, extracts only the ID information, and outputs the ID information to the CPU 19.

The RFID antenna 4 sends a radio signal over a predetermined communication range of, for example, 10 cm by sending a carrier wave of 13.56 MHz at predetermined intervals in accordance with ISO (International Organization for Standardization)/IEC (International Electrotechnical Commission) 14443.

When a cell phone terminal 52 having an RFID tag installed therein exists within the predetermined range over which the RFID antenna 4 sends the radio signal, that is, when the cell phone terminal 52 receives the radio signal from the RFID antenna 4, it sends ID information stored in an RFID tag (not illustrated) of the cell phone terminal 52. The ID information of the cell phone terminal 52 is authentication information used by the on-vehicle controller 11 for authenticating the cell phone terminal 52.

The RFID antenna 4 includes a resonant circuit composed of a coil 33 and a capacitor 34, and includes also a field-effect transistor 35. The antenna 4 generates a magnetic field from the coil 33, in accordance with a transmission signal sent from an RFID antenna driving/reception circuit 16, thereby sending a radio signal of 13.56 MHz. The antenna 4 outputs a radio signal from the cell phone terminal 52 to the RFID antenna driving/reception circuit 16 by magnetic induction of the coil 33 and the capacitor 34. The RFID antenna driving/reception circuit 16 filters out the carrier wave from the output radio signal so as to output the carrier wave to an RFID communication IC 21. Then, the RFID communication IC 21 extracts only the ID information, and outputs the ID information to the CPU 19.

The gate terminal of the field-effect transistor 35 is connected to the CPU 19, while the source and drain terminals are connected to connecting lines of the coil 33, the capacitor 34 and the RFID antenna driving/reception circuit 16. The field-effect transistor 35 is electrically disconnected or connected in accordance with a control signal supplied from the CPU 19. The field-effect transistor 35 is disconnected when communication with the cell phone terminal 52 is permitted. Because the field-effect transistor 35 is disconnected, the radio signal received by the coil 33 and the capacitor 34 is supplied to the RFID antenna driving/reception circuit 16 as a reception signal, while the transmission signal supplied from the RFID antenna driving/reception circuit 16 is sent as a radio signal by the coil 33 and the capacitor 34. Conversely, the field-effect transistor 35 is electrically connected, when communication with the cell phone terminal 52 is inhibited. Because the field-effect transistor 35 is electrically connected, the radio signal received by the coil 33 and the capacitor 34 is not supplied to the RFID antenna driving/reception circuit 16.

The on-vehicle controller 11 controls a smart keyless entry antenna driving circuit 20 and the RFID communication IC 21 so as to control operations of the smart entry antenna 5 and the RFID antenna 4. In addition, the controller 11 controls an actuator 18, based on the ID information received through the UHF antenna 15 and the ID information received through the RFID antenna 4. The on-vehicle controller 11 includes the CPU 19, the smart keyless entry antenna driving circuit 20 and the RFID communication IC (Integrated Circuit) 21.

Upon reception of a power supply by an actuator driving circuit 17, the actuator 18 operates the door lock mechanism so as to lock or unlock the door. The on-vehicle controller 11 outputs a signal for controlling the door lock mechanism to the actuator driving circuit 17 so as to operate the actuator 18 in accordance with this controlling signal.

When operation of the request switch 3 is detected, the CPU 19 executes radio communications using the smart entry antenna 5, and inhibits operation of the actuator 18 through radio communications using the RFID antenna 4, using carrier waves of different frequency bands. In accordance with the embodiment of FIG. 2, when the request switch 3 has not been operated, the CPU 19 causes the field-effect transistor 35 to be electrically disconnected, thereby supplying the radio signal from the cell phone terminal 52 to the RFID antenna driving/reception circuit 16 as a reception signal by magnetic induction of the coil 33. On the contrary, when the CPU 19 detects that the request switch 3 has been operated, it causes the field-effect transistor 35 to be electrically connected, and thus short-circuits the reception signal received by the RFID antenna 4 so as to inhibit the radio signal from being supplied to the RFID antenna driving/reception circuit 16. As a result, the RFID antenna 4 cannot receive the signal, radio communications using the RFID antenna 4 are inhibited, and the actuator 18 is prevented from operating through radio communications using the RFID antenna 4.

Operation of the door lock mechanism controller having the above-described structure will now be described with reference to FIG. 4.

Before the request switch 3 is operated, no magnetic field is generated from the smart entry antenna 5. As shown in FIG. 4D, a magnetic field is periodically generated from the RFID antenna 4, thereby periodically sending a radio signal of 13.56 MHz to search for the cell phone terminal 52. The period during which this search is performed is called an "RFID searching period". During this "RFID searching period", the CPU 19 causes the field-effect transistor 35 to be electrically disconnected, and permits transmission of a radio signal from the RFID antenna 4.

Upon detection that the request switch 3 has been operated at a time t1 as shown in FIG. 4A, the CPU 19 periodically supplies a radio signal transmission command for searching for the electronic key 51 outside the vehicle and a radio signal transmission command for searching for the electronic key 51 inside the vehicles, to the smart entry antenna 5 and an in-vehicle antenna (not illustrated), to command them to send a radio signal of 125 kHz. The period during which this radio signal is sent from the smart entry antenna 5 is called a "smart keyless entry searching period". During this "smart keyless entry searching period", the radio signal searching for the electronic key 51 outside the vehicle and the radio signal searching for the electronic key 51 inside the vehicle are scanned alternately. In a standby state for a response from the electronic key 51, when the electronic key 51 exists in a predetermined area outside the vehicle or inside the vehicle, the CPU 19 can obtain a response through a UHF radio signal from the electronic key 51, as shown in FIG. 4C.

While the radio signal from the smart entry antenna 5 is being scanned, the CPU 19 generates a controlling signal (inhibit signal) for causing the field-effect transistor 35 to be electrically connected, as shown in FIG. 4E. As a result, the CPU 19 can prevent the radio signal received by the RFID antenna 4 from being supplied to the RFID antenna driving/reception circuit 16, as shown in FIG. 4D. In this embodiment, the RFID antenna driving/reception circuit 16 is a single circuit. Thus, reception of the signal from the RFID antenna 4 be prevented in a simple fashion.

The "smart keyless entry searching period" ends when the electronic key 51 is detected and the door lock mechanism is operated by the actuator 18 during the "smart keyless entry searching period", or when no response has been generated from the electronic key 51 over a predetermined period of time after the radio signal from the smart entry antenna 5 has been scanned so as to search for the electronic key 51 a predetermined number of times. After that, it shifts to the "RFID searching period", and the field-effect transistor 35 is electrically disconnected. This results in canceling the prevention of reception of the radio signal through the RFID antenna 4, and restarting an operation for sending the radio signal from the RFID antenna 4 as shown in FIG. 4D.

As explained above, according to embodiments of the door lock mechanism controller of the present invention, the operation of the actuator 18 is inhibited based on the ID information received by the RFID antenna 4 when the radio signal is sent by the smart entry antenna 5. Thus, it can avoid interference occurring in simultaneous communication between the smart entry antenna 5 and the RFID antenna 4 using different communication systems, thereby controlling the door lock mechanism through stable communications with different communications systems. That is, as shown in FIG. 1, when the RFID antenna 4 and the smart entry antenna 5 are both contained in the same handle grip 2, only one of the antennas is driven. In this case, the other antenna is not influenced by noise of the driven antenna, avoiding any malfunction of the antenna. Specifically, the radio signal of 13.56 MHz is sent/received from and by the RFID antenna 4. Subsequently, when the RFID antenna 4 is excited by high frequency noise near 13.56 MHz that is included in a leakage flux of the 125 kHz signal generated from the smart entry antenna 5, the RFID antenna driving/reception circuit 16 is protected from this noise that might otherwise cause a malfunction.

According to the door lock mechanism controller in accordance with embodiments of the invention, the RFID antenna 4 is inhibited from receiving radio signals when a radio signal is being sent by the smart entry antenna 5. Therefore, the RFID antenna driving/reception circuit 16 is not affected by high-frequency noise, even if high-frequency noise from the smart entry antenna 5 has been detected.

Further, in the door lock mechanism controller according to the embodiments of the invention, the process for receiving the radio signal from the RFID antenna 4 and extracting ID information is blocked when the radio signal is sent from the smart entry antenna 5. Thus, the ID information is not affected by high frequency noise, even if high frequency noise from the smart entry antenna 5 has been detected.

According to the door lock mechanism controller according to the embodiments of the invention, searching for the electronic key 51 is stopped, and searching for the cell phone terminal 52 begins, when no response has been generated from the electronic key 51 for a predetermined period of time since the radio signal was transmitted from the smart entry antenna 5. As a result, the actuator 18 is prevented from operating over only a limited period of time based on the radio signal from the cell phone terminal 52. Therefore, stable communications can be realized using both of the antennas.

As shown in FIG. 3, in place of the field-effect transistor 35 included in the RFID antenna 4, the door lock mechanism controller may include a field-effect transistor 41 in a position for disconnecting a reception signal from the RFID antenna driving/reception circuit 16 to the RFID communication IC 21. In this structure, the actuator 18 is prevented from operating through radio communications using the RFID antenna 4 when operation of the request switch 3 is detected. In the field-effect transistor 41, the gate terminal is connected to the CPU 19, the source terminal is connected to a connecting line of the RFID communication IC 21 and the RFID antenna driving reception circuit 16, and the drain terminal is connected to ground.

In accordance with this embodiment that includes the field-effect transistor 41, the CPU 19 causes the field-effect transistor 41 to be electrically disconnected when operation of the request switch 3 is not detected. As a result, a reception signal may be transmitted from the RFID antenna driving/reception circuit 16 to the RFID communication IC 21. Subsequently, the RFID communication IC 21 executes a process for extracting ID information. On the other hand, when operation of the request switch 3 is detected, the CPU 19 causes the field-effect transistor 41 to be electrically connected. Then, the reception signal output from the RFID antenna driving/reception circuit 16 is interrupted by the field-effect transistor 41, and thus cannot be supplied to the RFID communication IC 21. As a result, the RFID communication IC 21 does not execute the process for extracting the ID information.

The above-described embodiments are examples of the present invention. Thus, the present invention is not limited to the above-described embodiments. Various changes can be made based on the design or implementation without departing from the technical spirit of the present invention.

In the above-described embodiments, the description has been made for the case where the radio signal is transmitted/received using an electromagnetic induction system. However, the present invention is not limited to this, and the radio signal can be transmitted/received using a radio wave system.

The above-described embodiments describe the case where radio communications are performed between the smart entry antenna 5 and the electronic key 51 and also between the RFID antenna 4 and the cell phone terminal 52. However, the radio communication system of the electronic key 51 and the radio communication system of the cell phone terminal 52 may be included in the same mobile terminal. Further, radio communications may also be performed between the smart entry antenna 5 and the electronic key 51 and a second smart entry antenna and a second electronic key.

Further, the above-described embodiments describe an example where the smart entry antenna 5 and the RFID antenna 4 are separate antennas. However, a single antenna circuit composed of a coil and a capacitor may transmit/receive both the radio signal for smart keyless entry and the radio signal for RFID.

Further, when a sensor for detecting operation of the door lock mechanism of the door panel 1 is connected as another on-vehicle controller 13, the CPU 19 may control the smart keyless entry antenna driving circuit 20 using a sensor signal from another on-vehicle controller 13 so as to send a radio signal from the smart entry antenna 5.

What is claimed is:
1. A door lock mechanism controller comprising:
a communication terminal configured to send an authentication signal for operating a door lock mechanism;

a first antenna and a second antenna each configured to send a radio signal;
a first communication device connected to the first antenna for receiving the authentication signal from the communication terminal;
a second communication device connected to the second antenna for receiving the authentication signal from another communication terminal; and
a control configured to selectively actuate the door lock mechanism based on one of the authentication signal received by the first communication device and the authentication signal received by the second communication device, wherein the control prevents actuation of the door lock mechanism based on the authentication information received by the second communication device while the radio signal is being sent by the first antenna,
wherein the first antenna and the second antenna are contained in a same door handle of a vehicle.

2. The door lock mechanism controller according to claim 1, wherein
the control inhibits the second antenna from receiving a radio signal, when a radio signal is sent by the first antenna.

3. The door lock mechanism controller of claim 1, wherein
the control inhibits a process for extracting the authentication signal included in the radio signal received by the second antenna, when a radio signal is sent by the first antenna.

4. The door lock mechanism controller of claim 1, further comprising:
an operational device that is operated by a user, wherein
the second communication device sends a radio signal from the second antenna at predetermined intervals, and
the control causes the first communication device to start sending a radio signal through the first antenna and to inhibit the second communication device from receiving a radio signal, upon operation of the operational device.

5. The door lock mechanism controller according to claim 1, wherein
the control stops sending a radio signal through the first antenna, and cancels inhibition of receiving a radio signal by the second communication device, when no response has been generated from the first communication terminal over a predetermined period of time in response to transmission of the radio signal through the first antenna.

6. A door lock mechanism controller comprising:
a first communication terminal configured to send a first authentication signal for operating a door lock mechanism;
a second communication terminal configured to send a second authentication signal for operating the door lock mechanism;
a first antenna configured to send a first radio signal;
a second antenna configured to send a second radio signal;
a first communication device connected to the first antenna for receiving the first authentication signal from the first communication terminal;
a second communication device connected to the second antenna for receiving the second authentication signal from the second communication terminal; and
a control configured to selectively actuate the door lock mechanism based on one of the authentication signal received by the first communication device and the authentication signal received by the second communication device, wherein the control prevents actuation of the door lock mechanism based on the authentication signal received by the second communication device, while the first radio signal is being sent by the first antenna,
wherein the first antenna and the second antenna are contained in a same door handle of a vehicle.

7. The door lock mechanism controller according to claim 6,
wherein the control prevents the second antenna from receiving the second radio signal while the first radio signal is being sent by the first antenna.

8. The door lock mechanism controller according to claim 6,
wherein the control prevents a process from extracting the authentication information included in the second radio signal received by the second antenna, while the first radio signal is being sent by the first antenna.

9. The door lock mechanism controller according to claim 6,
wherein the second communication device is configured to send the second radio signal from the second antenna at predetermined intervals,
wherein the control is configured to control the first communication device to start sending the first radio signal through the first antenna; and
wherein the control is configured to prevent the second communication device from receiving the second radio signal.

10. The door lock mechanism controller according to claim 6, wherein
the control stops sending the first radio signal through the first antenna, and cancels prevention of receiving the second radio signal by the second communication device, when no response has been generated from the first communication terminal over a predetermined period of time in response to transmission of the first radio signal through the first antenna.

11. A method for operating a door lock mechanism comprising:
controlling an actuator for operating a door lock mechanism for locking and unlocking a vehicle door,
sending a first radio signal through a first antenna so as to receive authentication information for operating the door lock mechanism from a first communication terminal;
sending a second radio signal through a second antenna so as to receive authentication information for operating the door lock mechanism from the second communication terminal;
controlling the actuator, based on one of the authentication information received by the first antenna and the authentication information received by the second antenna, and
preventing operation of the actuator based on the authentication information received by the second antenna, when the first radio signal is sent by the first antenna,
wherein the first antenna and the second antenna are contained in a same door handle of a vehicle.

12. A door lock mechanism controller comprising:
a communication terminal configured to send an authentication signal for operating a door lock mechanism;
a first antenna and a second antenna each configured to send a radio signal;
first communication means connected to the first antenna for receiving the authentication signal from the communication terminal; and second communication means connected to the second antenna for receiving the authentication signal from another communication terminal; and control means configured to selectively actuate the door lock mechanism based on one of the authentication signal received by the first communication means and the authentication signal received by the second communication means, wherein the control prevents actuation of the door lock mechanism based on the authentication information received by the second communication means while the radio signal is being sent by the first antenna, wherein the first antenna and the second antenna are contained in a same door handle of a vehicle.

* * * * *